United States Patent
Wigmore et al.

(10) Patent No.: US 11,100,027 B1
(45) Date of Patent: Aug. 24, 2021

(54) STORAGE DEVICE PROTOCOL DUAL PERSONALITY

(71) Applicant: EMC IP Holding Company LLC, Hopkinton, MA (US)

(72) Inventors: Ian Wigmore, Westborough, MA (US); Mona S. Tse, Hudson, MA (US); Michael E. Specht, Bolton, MA (US); Sanjib Mallick, Bangalore (IN); Vinay G. Rao, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/801,714

(22) Filed: Feb. 26, 2020

(51) Int. Cl.
*G06F 13/40* (2006.01)
*G06F 13/16* (2006.01)

(52) U.S. Cl.
CPC ...... *G06F 13/4027* (2013.01); *G06F 13/1668* (2013.01)

(58) Field of Classification Search
CPC ................. G06F 13/4027; G06F 13/1668
See application file for complete search history.

(56) References Cited

U.S. PATENT DOCUMENTS 8,060,777 B2 * 11/2011 Ninose ............... G06F 11/2069
714/6.3
2019/0114278 A1 * 4/2019 Olarig ................ G06F 13/1668

OTHER PUBLICATIONS

NVM Express, "Base Specification," NVM Express Revision 1.4, Jun. 10, 2019.
NVM Express: SCSI Translation Reference, Revision 1.4, Jan. 16, 2015.

* cited by examiner

*Primary Examiner* — Idriss N Alrobaye
*Assistant Examiner* — Ronald T Modo
(74) *Attorney, Agent, or Firm* — Muirhead and Saturnelli, LLC

(57) ABSTRACT

A storage entity of the data storage system may be visible to the host over a first path and a second path. The first path may operate in accordance with a first protocol and the second path may operate in accordance with a second different protocol. The storage entity may have a first protocol level personality and identity when presented to the host over the first path and a second protocol level personality and identity when presented to the host over the second path. A first native identifier associated of the storage entity on the first path and a second native identifier of the storage entity on the second path may be used to determine that the same storage entity is visible over the first and second paths even though the storage entity may have different protocol level identifiers on the first and second paths that operate using different protocols.

20 Claims, 11 Drawing Sheets

| NVMe protocol 510 | SCSI protocol 520 | | |
|---|---|---|---|
| Status code 510a | Status code 520a | Sense Key 520b | Additional Sense Code 520c |
| Success Completion | Good | No sense | |
| Invalid command opcode | Check condition | Illegal Request | Invalid command operation code |
| LBA out of range | Check condition | Illegal Request | LBA out of range |
| Reservation conflict | Reservation conflict | N/A | N/A |
| Write Fault | Check condition | Medium error | Peripheral device write fault |
| .. | .. | .. | .. |

FIG. 8

STORAGE DEVICE PROTOCOL DUAL PERSONALITY

BACKGROUND

Technical Field

This application generally relates to data storage.

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations. For example, a host may perform I/O operations such as data read and write operations sent to the data storage system.

The host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

An application may execute on a host where the application performs I/O (input/output) operations. The host may be able to transmit the I/O operations to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

Various embodiments of the techniques herein may include a method, a system and a computer readable medium for processing requests comprising: configuring a plurality of paths between a host and a data storage system, wherein a same storage entity of the data storage system is visible to the host over the plurality of paths, wherein a first of the plurality of paths is used to communicate using a first protocol and a second of the plurality of paths is used to communicate using a second protocol that is different from the first protocol, wherein the same storage entity is configured to have a first protocol level personality and identity when presented to the host over the first path and wherein the same storage entity is configured to have a second protocol level personality and identity when presented to the host over the second path; issuing a first request in accordance with the first protocol over the first path to the same storage entity to obtain a first device native identifier of the same storage entity; responsive to the first request, receiving a first response including first information denoting the first device native identifier of the same storage entity; issuing a second request in accordance with the second protocol over the second path to the same storage entity to obtain a second device native identifier of the same storage entity; responsive to the second request, receiving a second response including second information denoting the second device native identifier of the same storage entity; determining that the first native identifier and the second native identifier match; and responsive to determining the first native identifier and the second native identifier match, performing processing on the host that recognizes that the same storage entity is visible on both the first path and the second path. The first protocol level personality and identity may include a first protocol level identifier used to identify the same storage entity in accordance with the first protocol. The second protocol level personality and identity may include a second protocol level identifier used to identify the same storage entity in accordance with the second protocol. The first protocol level identifier and the second level protocol identifier may be different.

In at least one embodiment, processing may include determining the first device native identifier and the second device native identifier using one or more attributes of the data storage system upon which the same storage entity is configured. Determining the first device native identifier and the second device native identifier may use one or more local attributes of the same storage entity as defined in the data storage system upon which the same storage entity is configured. The first device native identifier and the second device native identifier may each be formed using a serial number or identifier of the data storage system. The first native identifier and the second native identifier may each be formed using a local device number of the same storage entity, wherein the local device number may uniquely identify the same storage entity with respect to other logical storage entities configured in the data storage system.

In at least one embodiment, a multi-path (MP) driver of the host may perform processing that recognizes that the same storage entity is visible on both the first path and the second path. The MP driver may present the same logical device to an application that issues a plurality of I/O operations to the same storage entity. The MP driver may transmit the plurality of I/O operations to the same storage entity over the plurality of paths. For each of the plurality of I/O operations, the MP driver may select, in accordance with a load balancing technique, one of the plurality of paths to send the I/O operation from the host to the data storage system.

In at least one embodiment, the first response may be sent over the first path from the data storage system to the host, and the second response may be sent over the second path from the data storage system to the host. The same storage entity may be visible to the host over a third of the plurality of paths, the first path and the third path may both communicate using the first protocol, the same storage entity may be configured to have a third protocol level personality and identity when presented to the host over the third path, the third protocol level personality and identity may include a third protocol level identifier, and the third protocol level identifier and the first protocol level identifier may match. A fourth path between the host and the data storage system may also operate using the first protocol. A second storage entity of the data storage system may be visible to the host over the fourth path. The second storage entity may have a fourth protocol level personality and identity including a fourth protocol level identifier. Processing may include determining whether the first protocol level identifier and the fourth protocol level identifier match; responsive to determining the first protocol level identifier and the fourth protocol level identifier match, determining that the second storage entity is the same storage entity; and responsive to determining the first protocol level identifier and the fourth protocol level identifier do not match, determining that the second storage entity and the same storage entity are two different storage entities.

BRIEF DESCRIPTION OF THE DRAWINGS

Features and advantages of the present invention will become more apparent from the following detailed description of exemplary embodiments thereof taken in conjunction with the accompanying drawings in which:

FIG. 8 is an example of a table of information that may be used in an embodiment in accordance with the techniques herein.

DETAILED DESCRIPTION OF EMBODIMENT(S)

Figure 1:
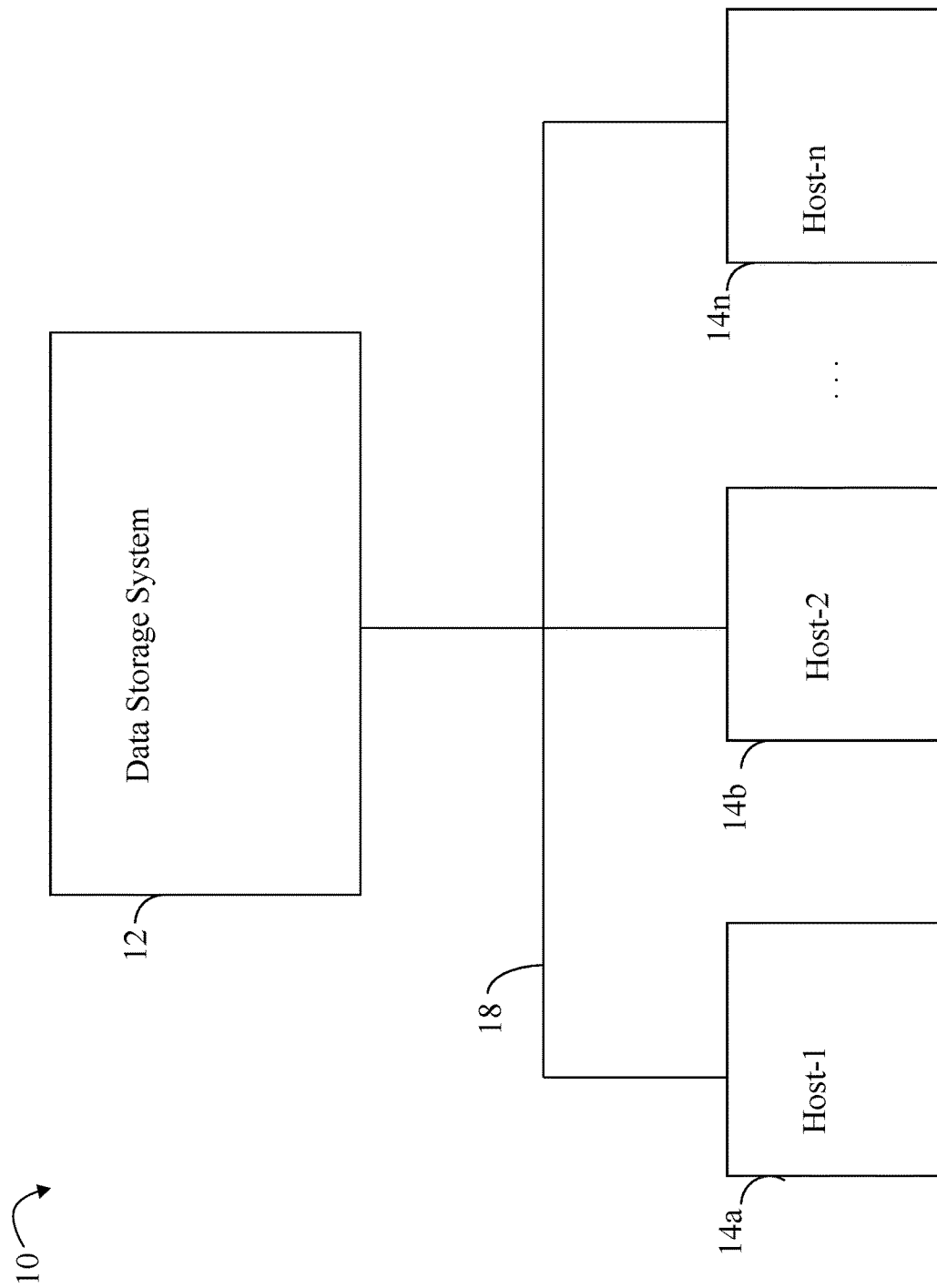
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system 12 may all be located at the same physical site, or, alternatively, may also be located in different physical locations. The communication medium 18 that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, NVMe (Non-Volatile Memory Express) over Fabrics, Infiniband (IB), and the like. Some or all of the connections by which the hosts and the data storage system 12 may be connected to the communication medium 18 may pass through other communication devices as well as other switching equipment that may exist such as a phone line, a repeater, a multiplexer or even a satellite.

Each of the host computer systems may include one or more applications that perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
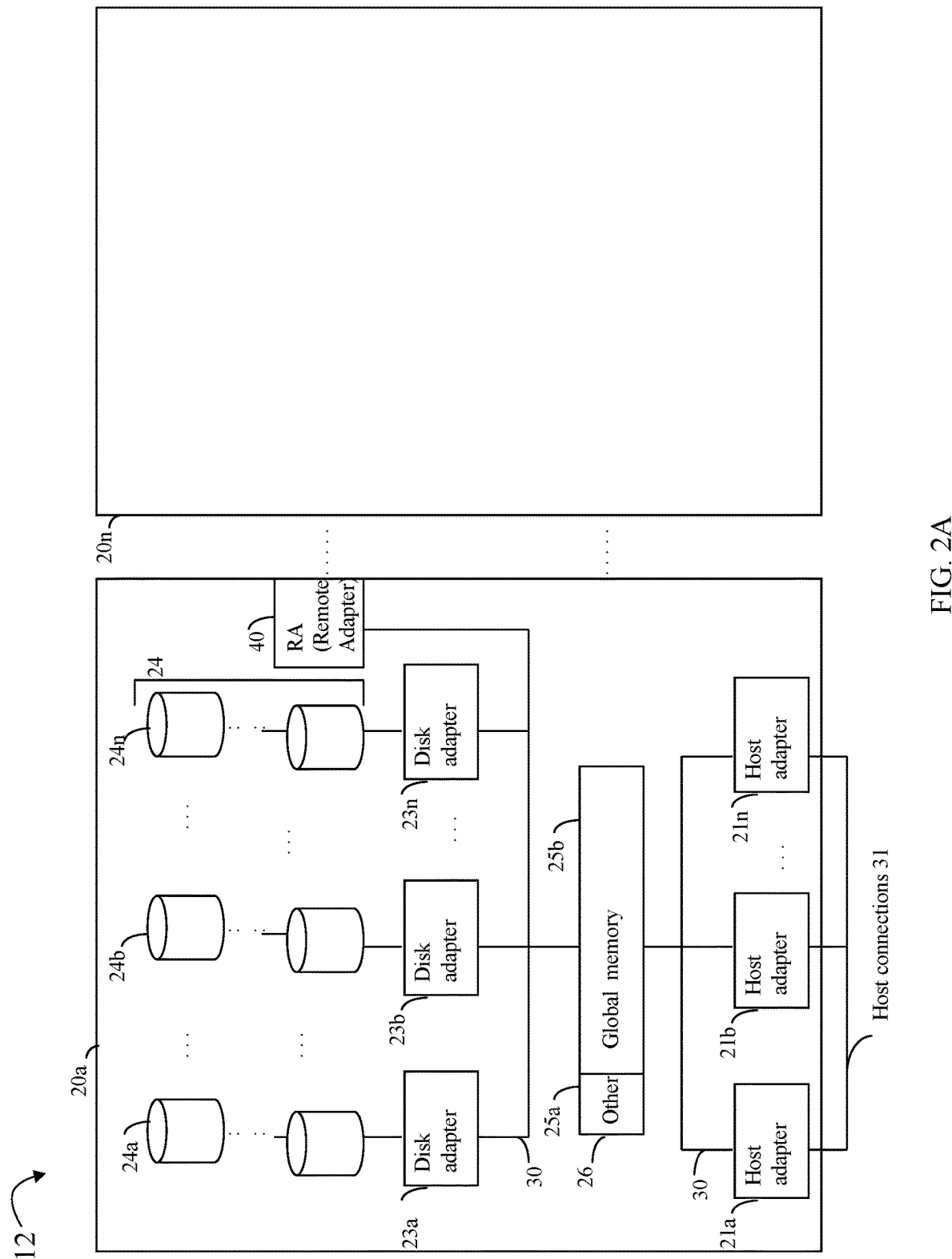
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of suitable back-end non-volatile storage device. For example, the physical devices included in an embodiment of a data storage system may include one or more types of rotating disk drives (e.g., SATA, SAS, FC 15K RPM, FC 10K RPM), one or more types of flash-based storage devices (e.g., SLC (single level cell) flash, MLC (multi-level cell) flash, TLC, (tri-level cell) flash) or more generally solid state drives (SSDs), and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, the directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. DAs may be characterized as backend components of the data storage system. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units of storage. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers, for example, in connection with the SCSI standard. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

As noted above, the DAs of the data storage system may be characterized as backend components of the data storage systems. The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Figure 2B:
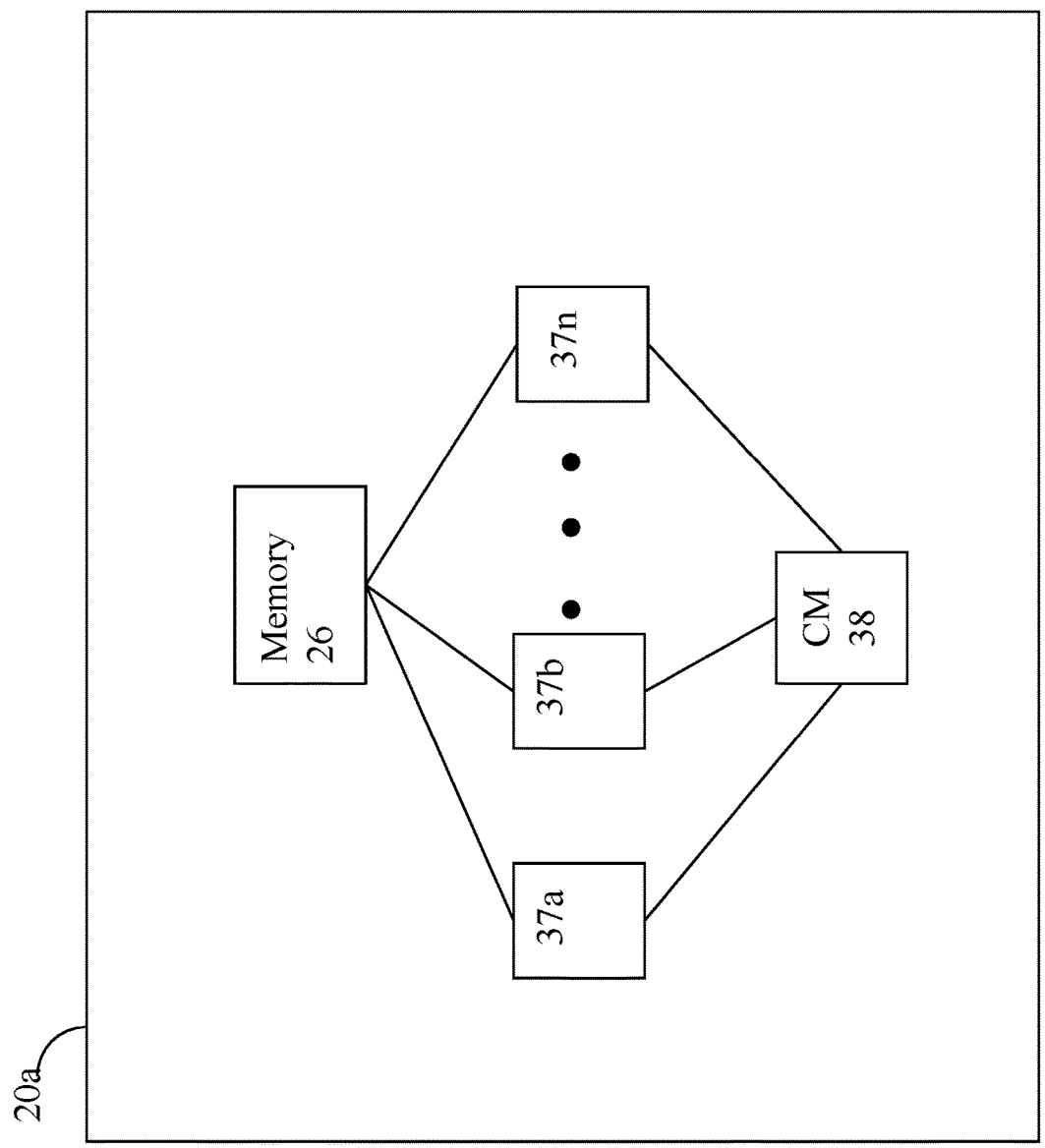
FIG. 2B is a representation of the logical internal communications between the directors and memory included in one embodiment of data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device, volume or other logical storage unit such as denoted by a LUN or other storage entity that may vary with the system and protocol. For example, in the NVMe protocol, a namespace may denote a logical storage unit, volume or device. Thus, although discussion herein may sometimes refer to a LUN, more generally, use of such the term LUN may more generally denote a logical storage unit volume or device that may have a different corresponding term for the storage entity, such as a namespace, in another protocol, such as NVMe. In discussion herein where a LUN may generally denote a logical device or unit of storage on the data storage system, the same logical device or unit of storage may have different identifiers used in different contexts and protocols. For example, a logical device configured on the data storage system may be exposed as a LUN to the host over a first path using the SCSI protocol. The LUN on the first path may be associated with an identifier, such as a world wide unique name (WWN) used in connection with the SCSI protocol of the first path. The same logical device may be exposed as a namespace to the host over a second path using the NVMe protocol. The LUN on the second path may be associated with a different identifier, such as a namespace globally unique identifier (GUID), used in connection with the NVMe protocol of the second path. As known in the art, a namespace in the NVMe protocol is storage formatted for block access and is analogous to a logical device or LUN in SCSI.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 3:
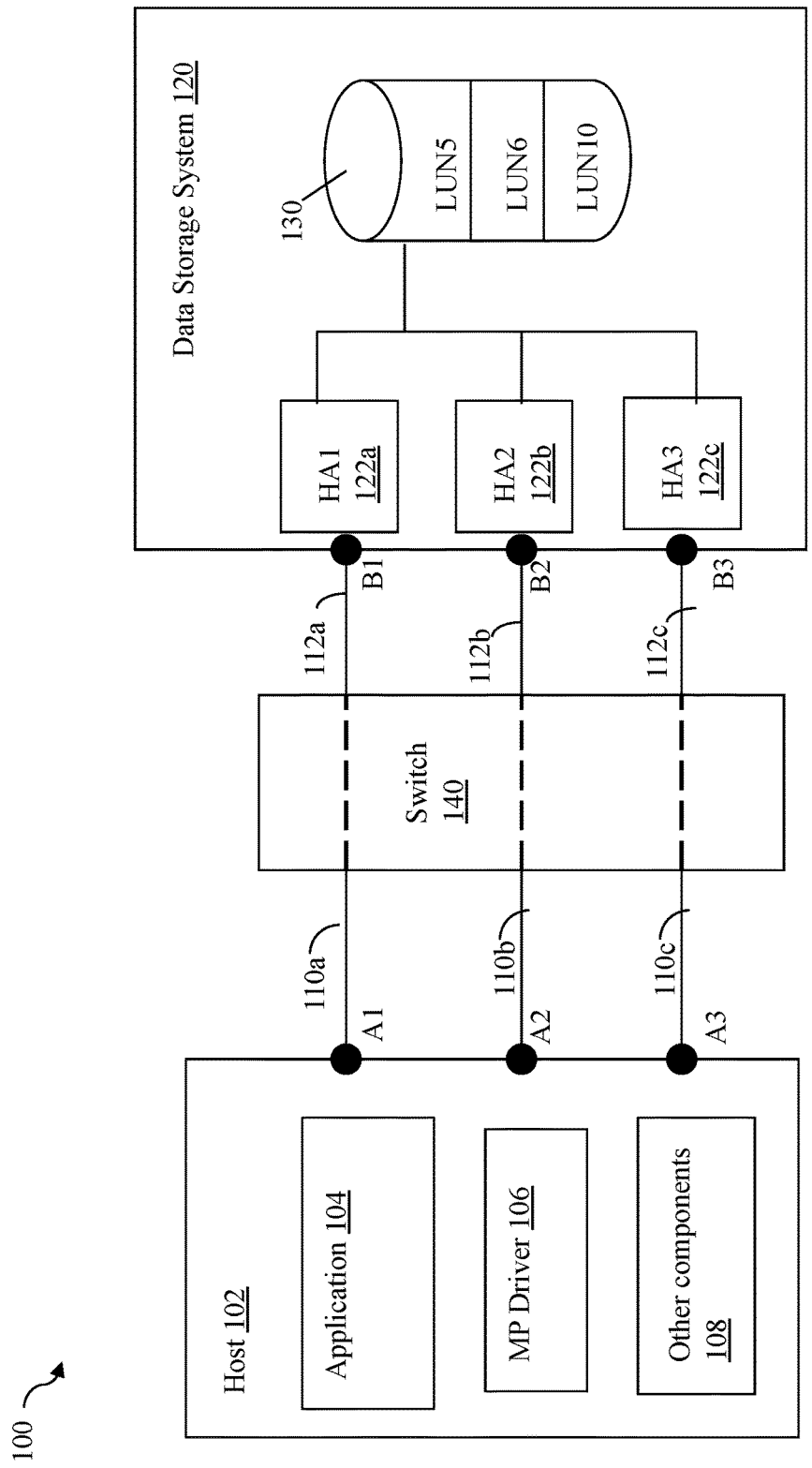
FIGS. 3, 6 and 7 are examples of systems and components that may be used in connection with the techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure.

The MP driver 106 may be included in a commercially available product such as, for example, Dell® EMC PowerPath® software. The host 102 may also include other components 108 such as one or more other layers of software used in connection with communicating the I/O operation from the host to the data storage system 120. For example, element 108 may include Fibre Channel (FC), SCSI and/or NVMe drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC, SCSI or NVMe driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
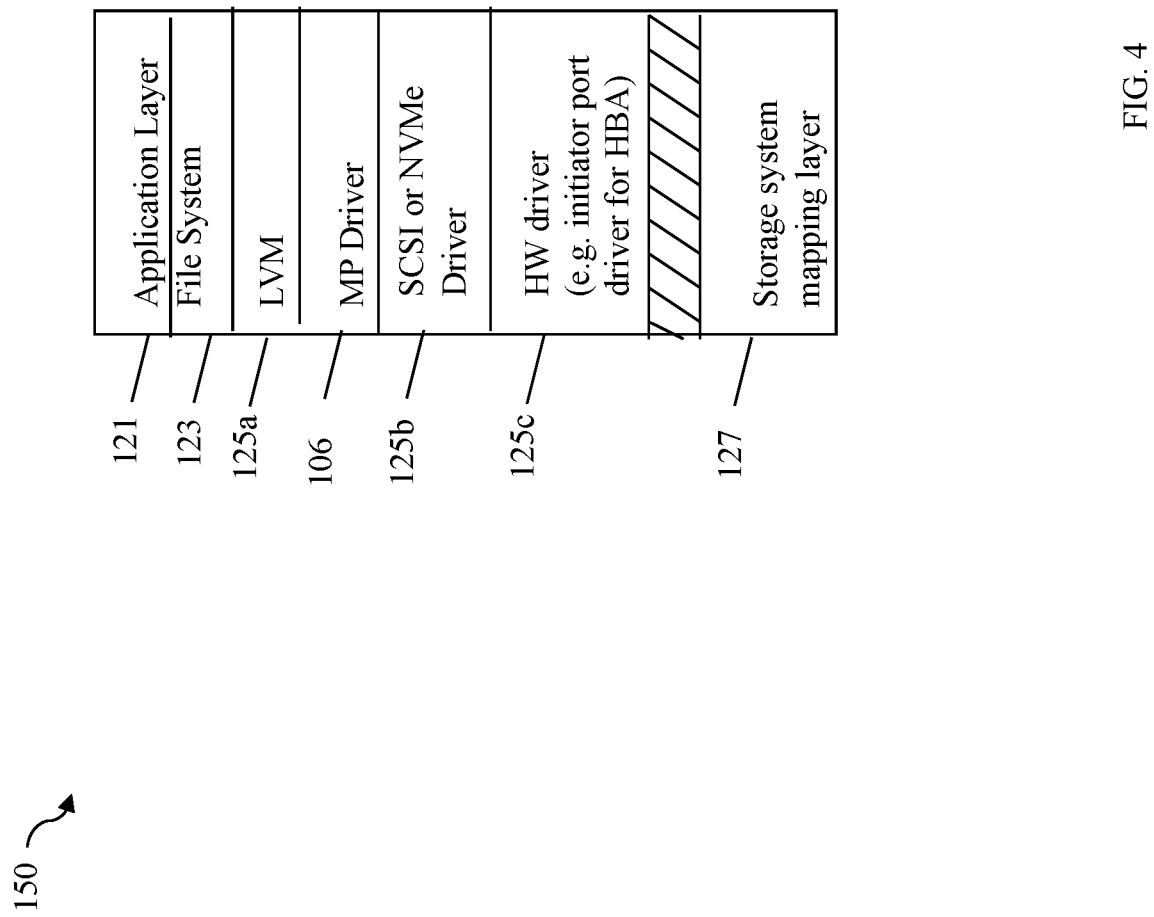
FIG. 4 is an example of different software layers that may be included in a host and a data storage system in an embodiment in accordance with the techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI or NVMe driver 125b and a hardware (HW) driver 125c. In at least one embodiment the driver 125b may be a SCSI driver that handles processing of a received I/O request from the MP driver 106 such as related to forming a request in accordance with the SCSI standard. As a variation, in at least one embodiment, the driver 125b may be an NVMe driver that handles processing of a received I/O request from the MP driver 106 such as related to forming a request in accordance with the NVMe standard. At least one embodiment in accordance with the techniques herein may operate in accordance with the NVMe protocol as described, for example, in the NVM Express™ Base Specification, Revision 1.4, Jun. 10, 2019, available at nvmexpress.org/wp-content/uploads/NVM-Express-1_4-2019.06.10-Ratified.pdf. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI or NVMe driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In connection with some protocols such as SCSI and NVMe, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In connection with the NVMe protocol, communication of I/O operations or other commands may be bidirectional in that either endpoint may act as an initiator and either endpoint may act as a target. In contrast, with other protocols such as the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or a write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In an embodiment using the NVMe standard as known in the art and described elsewhere herein, each path or physical link may generally include one or more logical connection, streams or queues. In contrast, the SCSI standard is an example of a protocol that may be characterized as using only a single logical connection per specified path or physical link between a host port and a data storage system port over which LUNs (e.g., logical storage device or units referred to in terms of the NVMe standard as namespaces) are exposed or visible for I/O operations. Generally, the single logical connection may denote a single logical stream or queue of I/Os that may be issued sequentially over the single logical connection.

The techniques herein may be used with a protocol such as NVMe in which there are multiple logical connections, streams or queues per specified path or physical link. For example, an embodiment may use the NVMe over FC protocol to define and use multiple logical connections in a single path or physical link. In such an embodiment, the multiple logical connections may be implemented using multiple logical entities operating over the same path or physical link. In at least one embodiment using NVMe, the HBA on the host may implement multiple dynamic controllers as the host side logical entities of the multiple logical connections of the same path. The host side logical entities have a corresponding data storage system side logical entity forming the multiple logical connections, queues or streams. A single logical connection may be between one of the host side logical entities and a corresponding one of the data storage system side logical entities. The logical connections on the same path of physical link may share resources of the same path or physical link. The multiple logical connections operating on the same path or physical link may operate in parallel. Each of the logical connections may operate independently of the other remaining logical connections. I/Os may be sent in parallel over the multiple logical connections on the same path or physical link at the same time.

Figure 5A:
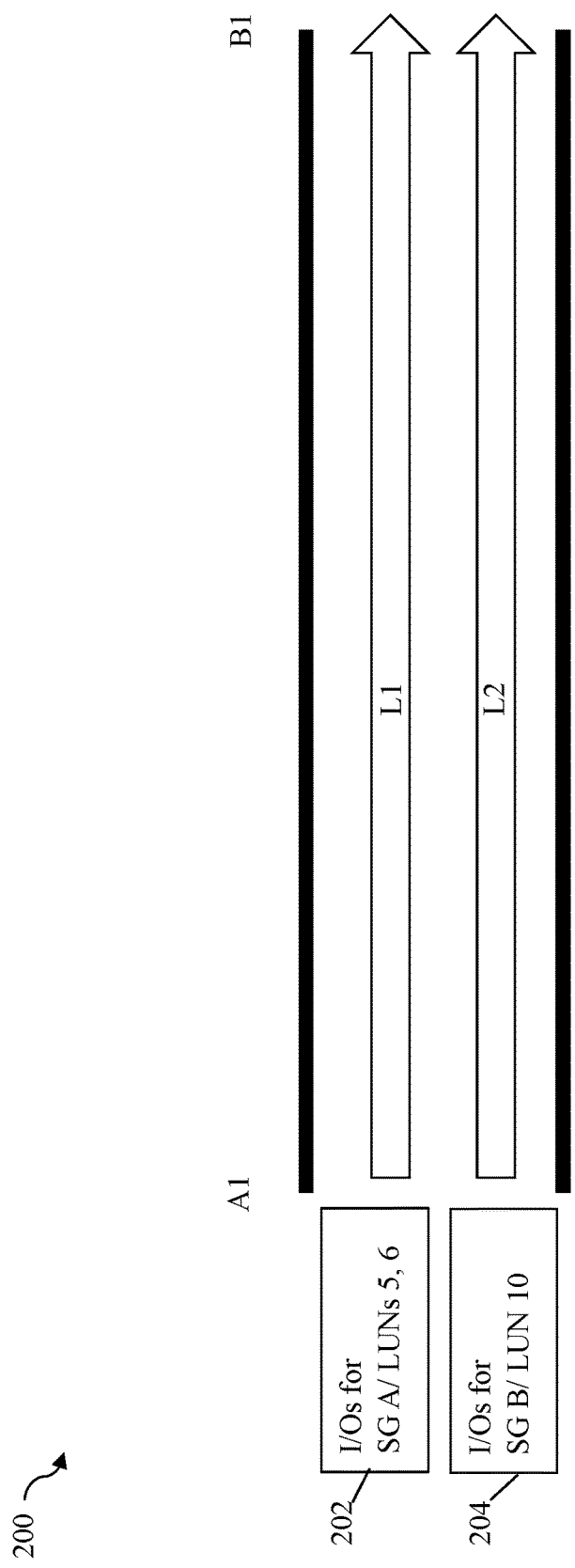
FIG. 5A is an example illustrating a path with multiple logical connections, streams or queues of I/Os as may be used with the NVMe (Non-Volatile Memory express) protocol in an embodiment in accordance with the techniques herein.

Referring to FIG. 5A, shown is an example illustrating multiple logical connections over a single path or physical link in an embodiment in accordance with the techniques herein. In connection with FIG. 5A, assume there is a logically defined storage group SG A including LUNs 5 and 6 and also a defined storage group SG B including LUN 10. In this example, the LUNs 5 and 6 of SG A and the LUN 10 of SGB may all be exposed over the same single path or connection A1-B1 between the host and the data storage system. However, as noted below, different logical connections may be used for servicing I/Os of SGA and SGB.

The example 200 illustrates the single path or physical link A1-B 1 as described in connection with FIG. 3. The example 200 illustrates an embodiment in which 2 logical connections, streams or queues of I/Os may be configured for the single path or physical link A1-B1. In this example, L1 may denote one of the logical connections used to send I/Os 202 directed to LUNs 5 and 6 of SG A. L2 may denote a second of the logical connections used to send I/Os 204 directed to the LUN 10 of SG B. It should be noted that although only 2 logical connections are illustrated for the single path, an embodiment may include any suitable number of logical connections configured for the single path. The number of logical connections allowable for configuration over the single path may vary with embodiment. In one aspect, the number of logical connections allowable may depend on the particular protocol or standards, vendor implementation, and the like.

FIG. 5A illustrates one configuration of the same path or physical link including multiple logical connections such as in connection with the NVMe standard.

Figure 5B:
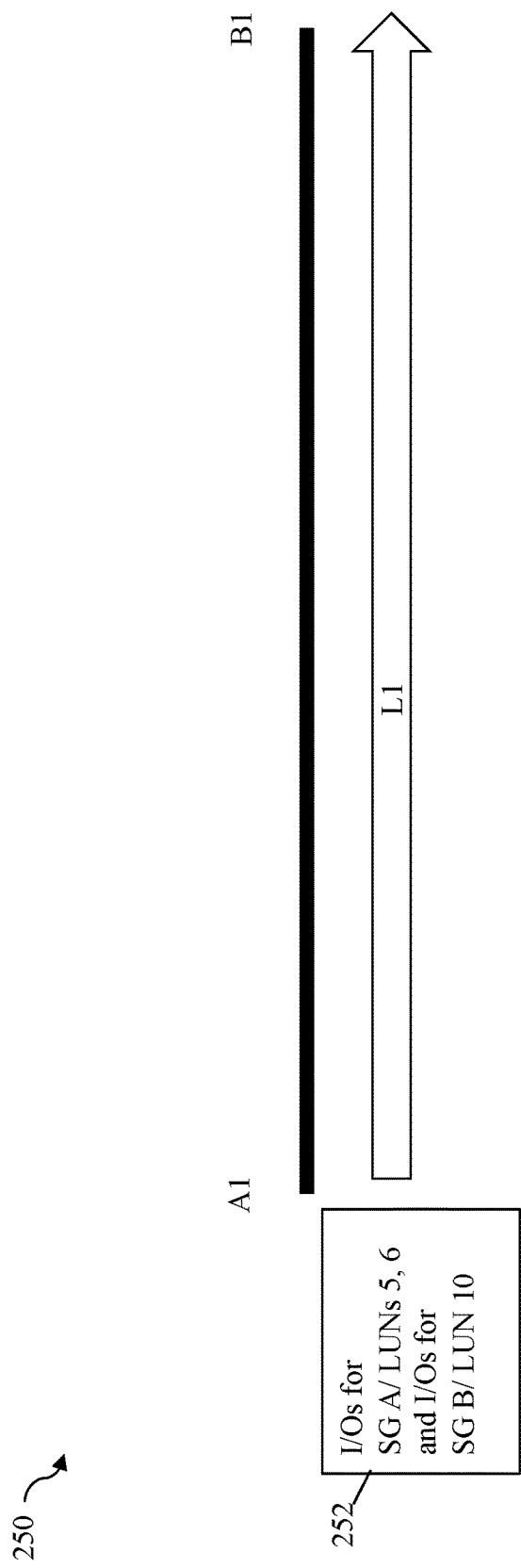
FIG. 5B is an example illustrating a path with a single logical connection, stream or queue of I/Os as may be used with the SCSI (Small Computer System Interface) protocol in an embodiment in accordance with the techniques herein.

In contrast to FIG. 5A, reference is made to FIG. 5B illustrating use of the same path or physical link A1-B 1 but where the path is a SCSI path rather than an NVMe path as illustrated in FIG. 5A. In the FIG. 5B, assume that the LUNs 5 and 6 of SG A and the LUN 10 of SGB are exposed over the path A1-B1. In the example 250, there is only a single logical connection, stream or queue used to send I/Os directed to the LUNs 5, 6, and 10. The element 252 denotes the single aggregated stream or queue used to sequentially send I/Os directed to LUNs 5, 6 and 10 from the host to the data storage system.

In some existing systems, the host operating system is unable to communicate with, and send I/O operations to, the same LUN or logical device on the data storage system using 2 different protocols, such as SCSI over FC and NVMe over FC, since the 2 different protocols of SCSI and NVMe are not supported at the same time to access the same LUN. Such a limitation means multipathing, in which the same LUN is accessed over multiple paths, is limited to accessing the same LUN over multiple paths all using the same protocol. More generally, such a limitation as the foregoing prevents performing different tasks and operations in which the same LUN is accessible or visible to the host simultaneously using 2 different protocols, such as SCSI over FC and NVMe over FC.

Described below are techniques that may be used in which the same LUN of the data storage system is simultaneously exposed, visible and accessible to the host using 2 different protocols. In at least one embodiment, the same LUN may be exposed to the host over 2 different paths in which each of the 2 paths provides access to the same LUN using a different one of the 2 protocols. For example, in at least one embodiment, a first LUN may be exposed to the host over a first path from a first initiator port of the host to a first target port of the data storage system. The first LUN may also simultaneously be exposed to the host over a second path from a second initiator port of the host to a second target port of the data storage system. The first path may be, for example, a SCSI over FC connection where the host may issue I/O commands to the first LUN in accordance with the SCSI protocol. The second path may be, for example, an NVMeoFC (NVMe over FC) connection where the host may issue I/O commands to the first LUN in accordance with the NVMe protocol.

In at least one embodiment, the host performs processing to detect the fact that the first LUN is exposed, visible and accessible over 2 different paths where each of the 2 paths uses a different protocol. In at least one embodiment, the MP driver of the host may be aware that the same first LUN is exposed over the foregoing 2 different paths even though the first LUN has different protocol level device personalities, attributes and identities on the 2 paths. The MP driver automatically detects when the same first LUN is presented over the 2 paths using 2 different protocol level device personalities and identities. Effectively, the same first LUN is presented to the host as 2 different devices or LUNs over 2 different paths since the first LUN has a first protocol level device personality and identity on a first path using the first protocol (e.g., SCSI). The same first LUN also has a second protocol level device personality and identity on a different second path that uses the second protocol (e.g., NVMe) different from the first protocol. The MP driver performs processing to detect that the 2 different LUNs having different protocol level device personalities and identities on different paths are actually the same first LUN. The MP driver then presents both LUNs as the same first LUN to layers in the I/O path or data path above the MP driver (e.g., layers above the MP driver in the I/O path or data path as illustrated by the runtime stack in the FIG. 4). For example, the MP driver presents both LUNs of the 2 different paths using 2 different protocols as the same first LUN to an application that may issue I/Os to the first LUN. More generally, the same LUN may be presented over any number of multiple paths, where each such path may use a different communication protocol and may present the same LUN on that particular path using a different device personality and identity that varies with the particular protocol(s) used for communications on the path.

In at least one embodiment, the techniques herein allow for a LUN to be visible to the host via multiple paths, multiple protocols and multiple protocol level device identities, but where all such multiple protocol level device identities of the LUN are recognized by the MP driver as the same LUN over all such the multiple protocols and paths.

In at least one embodiment, the techniques herein may implement a new methodology as follows. A LUN of the data storage system may be configured to have 2 (or possibly more if needed) different protocol level device personalities and identities. For example, the LUN may have a first protocol level personality and identity exposed over a first path in accordance with the SCSI protocol, and the LUN may also have a second protocol level personality and identity exposed over a second path in accordance with the NVMe protocol. In response to the host issuing a first command, such as the SCSI inquiry page 0x83 command, over the first path to the data storage system, the first protocol level personality and identity may be returned. In response to the host issuing a second command, such as the NVMe Identify command, over the second path to the data storage system, the second protocol level personality and identity may be returned.

To the host operating system, the responses to the foregoing 2 commands issued over the first and second paths indicate two different LUNs or logical devices.

However, the MP driver may issue additional commands over the first and second paths to obtain device native IDs (identifiers) for the two different LUNs or devices that are exposed on different paths and that have the different protocol level personalities and identifiers. The responses received over both the first and second paths to the additional commands may be used to determine whether the two different device identities and personalities actually refer to the same device native ID and thus the same underlying LUN exposed with different protocol level personalities and identifiers. For example, the MP driver may issue an additional command, such as the SCSI inquiry Device Constituents VPD page (0x8B) command, to a first LUN exposed over the first path and may receive in response the device native ID for the first LUN. The MP driver may issue an equivalent command, such as the NVMeoFC Identify command, to a second LUN over the second path to obtain the device native ID for the second LUN. The MP driver may compare the two device native IDs returned over the first and second paths in response to the additional commands. If the device native IDs of the first and second LUNs are the same, then the MP driver may determine that the two different device personalities and identities of the first and second LUNs are actually the same LUN presented by the data storage system over different paths using different protocols.

In the SCSI standard, the SCSI inquiry Device Constituents VPD page (0x8B) command (e.g., inquiry command 0x12; EVPD bit set to 1; PAGE CODE byte set to 0x8B) reports data relative to the underlying physical data storage system. Thus, the information returned in response to this command varies with the physical data storage system upon which the LUN is located.

The MP driver may automatically detect that the same LUN of the data storage system is visible via two different protocol level device identities and personalities over two different paths with different protocols, and present such different protocol level device identities and personalities typically associated with different LUNs as the same single LUN to the layers above the MP driver in the I/O path or data path.

The MP driver may mitigate any differences between the protocols, such as for different commands that may be issued over the different paths using the different protocols. For example, consider a LUN exposed over a first path used for SCSI communications and a second path used for NVMe communications. Assume further, for example, that a SCSI persistent reservation is placed on the LUN by issuing a command over the first path using a SCSI-based command. In such an embodiment, the MP driver may, for example, provide for translating between different reservation states of the various different protocols of the first and second paths over which the same LUN is presented. The MP driver may also translate or map error codes and state information between the NVMe and SCSI protocols. For example, the MP driver may receive an error code or state information as a result of an I/O operation issued over the second NVMe path to the LUN which indicates a media or hardware error. The MP driver may determine the equivalent error code or state information in the SCSI protocol and note the equivalent error code or state information as the state of the LUN on the first SCSI path.

In connection with discussion herein regarding persistent reservations, the SCSI standard and protocol as known in the art may include SCSI-3 Persistent Reservations (PR) that enables access for multiple hosts to a device and simultaneously blocks access for other hosts. SCSI-3 PR uses a concept of registration and reservation. Each system, such as each host, registers its own "key" with a SCSI-3 device (e.g., LUN). Multiple systems registering keys form a membership. A host registered with a device may then establish a reservation with respect to the device. For example, a reservation may be established for "Write Exclusive Registrants Only." The WERO reservation setting enables only registered systems for the device to perform write operations. Thus, other unregistered host may be able to read from the device but not allowed to write to the device. Other types of reservations with different types of reserved access, such as exclusive access or exclusive write access, may be established as known in the art and in the SCSI standard. SCSI-3 PR has been adopted as part of the NVMe standard and may be referred to as NVMe Reservations. NVMe Reservations is functionally like SCSI-3 PR and may be used to provide capabilities utilized by two or more hosts to coordinate access to a shared namespace. An NVMe Reservation on a namespace restricts hosts access to that namespace. In a manner similar to SCSI-3 PR, an NVMe Reservation requires an association between a host and a namespace as used in connection with the NVMe standard.

In at least one embodiment in accordance with the techniques herein, data written to a data storage LUN exposed over the first path and having the first protocol level device identifier and personality is also available and accessible over the second path associated with the second protocol level device identifier and personality. In connection with the foregoing there is only a single LUN that is exposed over both the first and second paths using different protocol level device identifiers and personalities. Thus, updates to the LUN that is exposed over the first path and associated with the first protocol level device identifier and personality also result in the updates to the same LUN also exposed over the second path (with a different protocol level device identifier and personality).

The foregoing and other aspects of the techniques herein are described in more detail in following paragraphs.

Figure 6:
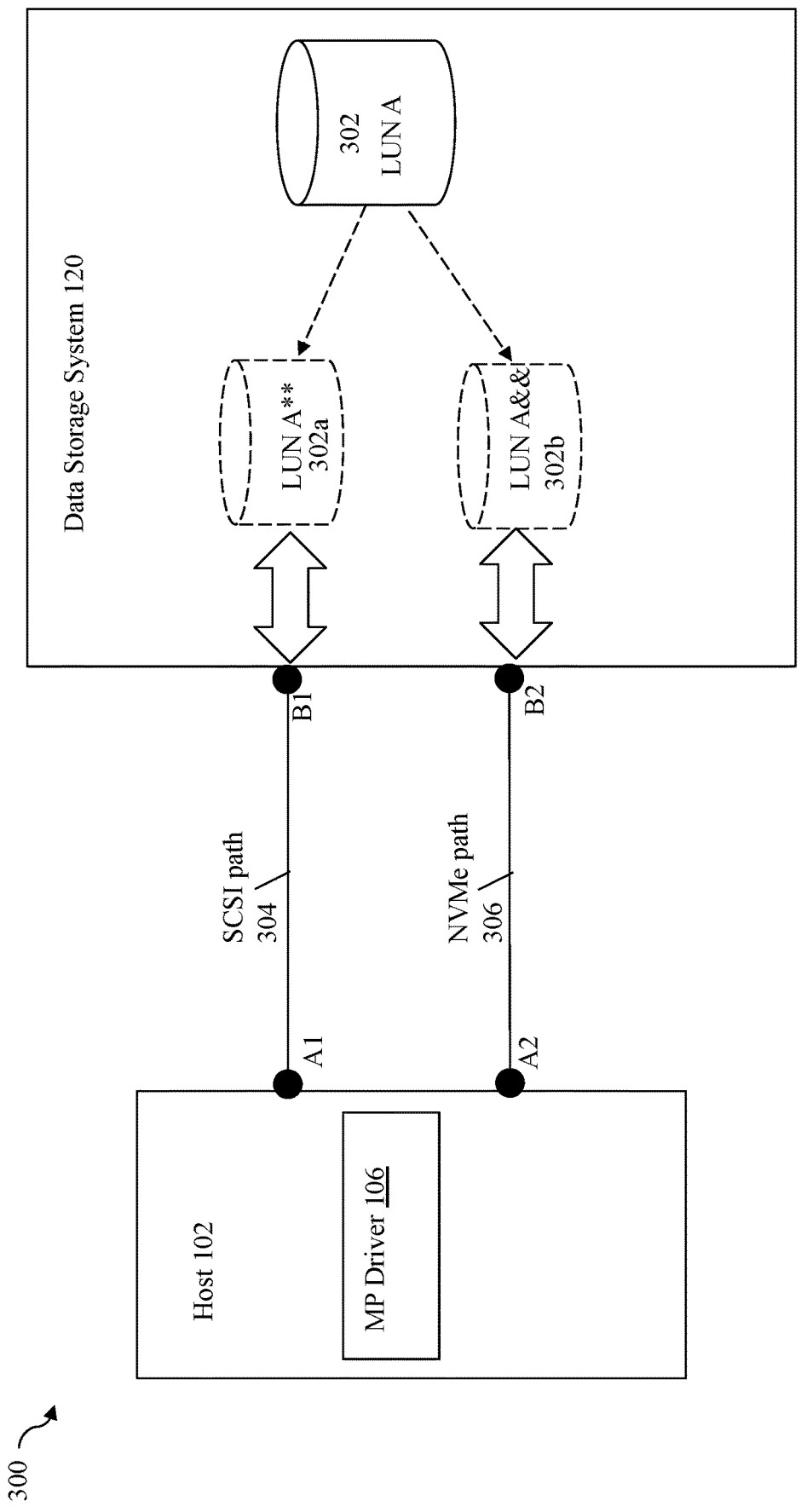

Referring to FIG. 6, shown is an example of components and systems that may be used in an embodiment in accordance with the techniques herein. The example 300 includes the host 102 and the data storage system 120 such as described in connection with FIG. 3 and others above. In the example 300, the LUN A 302 may be configured on the data storage system 120. The single LUN A 302 may be exposed to the host 102 over 2 different physical paths or links A1-B1 304 and A2-B2 306. The path 304 may be a SCSI connection such as a SCSI over FC connection over which transmission, such as commands, I/O operations and the like, are sent in accordance with the SCSI standard and protocol. The path 306 may be an NVMe connection such as an NVMe over FC connection over which transmission, such as commands, I/O operations and the like, are sent in accordance with the NVMe standard and protocol.

The single LUN A 302 is exposed to the host 102 over both the SCSI path 304 and the NVMe path 306. The LUN A302a and the LUN A&& 302b denote different logical views of the same LUN A 302 presented, respectively, over the 2 paths 304 and 306. The LUN A 302a denotes the SCSI protocol level personality and identity of the LUN A 302 presented over the SCSI path 304 to the host 102. Thus, the LUN 302a in the example 300 may represent the logical device LUN A 302 as presented to the host 102 over the SCSI path 304. The LUN A&& 302b denotes the NVMe protocol level personality and identity of the LUN A 302 presented over the NVMe path 306 to the host 102. Thus, the LUN 302b in the example 300 may represent the logical device LUN A 302 as presented to the host 102 over the NVMe path 306.

The host 102 is illustrated as including the MP driver 106 and may include other components as described herein but which have been omitted from the example 300 for simplicity of illustration. The MP driver 106 may issue a first command, the SCSI inquiry page 0x83 command, over the SCSI path 304 to the data storage system. The SCSI inquiry page 0x83 command may request to return information about a device, such as LUN A 302a. The MP driver 106 may also issue a second equivalent NVMe command, such as the NVMe Identify command, over the NVMe path 306 to return information about the LUN A&& 302b. In response to the host issuing the SCSI inquiry page 0x83 command over the SCSI path 304 to the LUN A 302a the data storage system, the data storage system may return information regarding the LUN A** 302a denoting the SCSI protocol level personality and identity of the LUN A 302. In response to the host issuing the equivalent NVMe Identify command requesting information about LUN A&& 302b over the NVMe path 306 to the data storage system, the data storage system may return information regarding the LUN A&& 302b denoting the NVMe protocol level personality and identity of the LUN A 302.

First information returned over the SCSI path 304 in response to the first command note above characterizes or describes the LUN A 302 as used in connection with its associated SCSI protocol level personality and identity 302a. For example, the first information returned may include a SCSI-based identifier associated with LUN A 302 such as the LUN's WWN as used in connection with the SCSI protocol. Second information returned over the NVMe path 306 in response to the second command characterizes or describes the LUN A 302 as used in connection with its associated NVMe protocol level personality and identity 302b. For example, the second information returned may include an NVMe-based identifier associated with LUN A 302 such as a namespace GUID as used in connection with the NVMe protocol. The namespace GUID for the LUN A 302 (used with the NVMe protocol over the path 306) and the WWN for the LUN A 302 (used with the SCSI protocol over the path 304) may be different. From the viewpoint of the host and the MP driver, additional information is needed to determine whether a first logical device LUN A** 302a that is presented over the path 304 having the first SCSI protocol level personality and identity and a second logical device LUN A&& 302b that is presented over the path 306 having the second NVMe protocol level personality and identity are actually the same logical device, LUN A 302.

To accomplish this, an embodiment in accordance with the techniques herein may have the MP driver 106 issue additional commands to facilitate the MP driver 106 determining whether the above-noted first and second logical devices exposed, respectively, over the paths 304, 306 are the same logical device, LUN A 302.

In at least one embodiment, the MP driver may issue additional commands over the paths 304 and 306 to obtain device native IDs for the first logical device LUN A** 302a (denoting the LUN A 302) exposed over the SCSI path 304, and for the second logical device LUN A&& 302b (denoting the LUN A 302) exposed over the NVMe path 306. For example, the MP driver may issue an additional third command, such as the SCSI inquiry Device Constituents VPD page (0x8B) command, to the first logical device 302a exposed over the SCSI path 304 and may receive in response a first device native ID for the first logical device 302a. The MP driver may issue an equivalent fourth command, such as an NVMe Identify command, to the second logical device 302b exposed over the NVMe path 306 and may receive in response a second device native ID for the second logical device 302b. The MP driver may compare the first and the second device native IDs returned, respectively, over the paths 304 and 306 in response to the additional third and fourth commands. If the two device native IDs of the LUNs 302a, 302b are the same, then the MP driver may determine that the two different device personalities and identities of the first and second LUNs 302a, 302b actually refer to the same LUN A 302 presented by the data storage system over different paths using different protocols. In this example 300, the MP driver may determine that the first device native ID and the second device native ID match and therefore refer to the same LUN A 302 exposed over the two different paths 304 and 306. Otherwise, if the MP driver determines that the first device native ID and the second device native ID do not match, the MP driver may not recognize the presented LUNs 302a and 302b as referring to the same logical device. In this latter case where the 2 device native IDs differ, the MP driver may continue to treat the LUNs 302a and 302b as two different logical devices exposed respectively over the paths 304 and 306.

A device native ID may be associated with each LUN, such as LUN A 302, of the data storage system 120. In at least one embodiment, the device native ID for a LUN may be determined based on one or more native or local attributes of the LUN and the data storage system in which the LUN is configured. In at least one embodiment, the device native ID for LUN A 302 may be determined using the data storage system serial number or ID in combination with a local device number of the LUN A 302. The local device number of the LUN A 302 may be a local device number or ID assigned to the LUN A 302 having a level of uniqueness with respect to the data storage system 120. For example, another different LUN of another data storage system may have the same local device number or ID as LUN A. However, no other LUN in the system 120 is assigned the same local device number as that of LUN A 302. The data storage system serial number or ID may uniquely identify the data storage system 120 with respect to other data storage systems, for example, of the same type or model provided by the same vendor. Thus, in such an embodiment, the device native ID of the LUN may be characterized as dependent on the physical data storage system upon which the LUN is configured and exposed to clients.

In at least one embodiment, the device native ID of a LUN may be used to uniquely identify and distinguish the LUN from all other LUNs within the SAN. Thus the device native ID for a LUN may be characterized as a globally unique LUN ID used to differentiate the LUN globally within the SAN across multiple data storage systems in the SAN. The device native ID may be used to uniquely identify a LUN independent of the particular paths and protocols used to expose the LUN to a client such as the data storage system. In other words, different commands of multiple protocols issued over multiple paths may be used to request an exposed LUN's device native ID. However, the device native ID for the LUN returned on all such paths over which the LUN is exposed is the same. In this manner, the device native ID may be used to determine an identity of a LUN independent of different protocol level device personalities and identifiers that the same LUN may have when exposed over different paths operating using different protocols.

In at least one embodiment as noted above, the LUN's device native ID may be based on one or more attributes of the LUN and one or more attributes of the native or local data storage system upon which the LUN is provisioned. However, more generally, any suitable technique may be used to form and generate device native IDs for the LUNs, such as LUN A 302. For example, as an alternative, in at least one embodiment, the device native IDs for LUNs may be randomly generated number or identifiers.

In the example 300 as noted above, the MP driver may recognize the LUNs 302a and 302b as the same logical device, LUN A 302, exposed over the two paths 304 and 306. The MP driver transparently presents the single LUN A 302 to layers above the MP driver in the I/O path or data path. The MP driver may perform path selection to select one of the possible multiple paths 304 and 306 based on one or more criteria such as load balancing to distribute I/O requests for the target device LUN A 302. Load balancing may be performed to provide for better resource utilization and increased performance of the host, data storage system, and network or other connection infrastructure. For example, the MP driver may perform processing for load balancing in efforts to improve I/O performance by reducing I/O response time (RT). In at least one embodiment, the MP driver may use a load based I/O distribution algorithm to select one of the paths 304 and 306 when an application sends an I/O operation to the LUN A 302. For example, the MP driver may select the least busy one of the paths 304, 306 and use the selected path to transmit an I/O. Generally, any suitable technique may be used to select one of the available paths 304 and 306 when sending I/O directed to the LUN A 302.

For resiliency, if the LUN A 302 is not accessible over one of the paths 304 and 306, the other remaining one of the paths 304 and 306 may be used to send I/Os to the LUN A 302 despite the different protocols used on the different paths 304, 306. The failover for sending I/Os between the different paths 304 and 306 may be performed seamlessly and is not visible to layers, such as the application layer, above the MP driver.

In at least one embodiment, the MP driver may perform processing to mitigate any differences between the various protocols of the multiple paths 304 and 306 to LUN A 302. For example, the MP driver may perform processing to mitigate any differences such as with respect to commands, status codes and state information (e.g., returned in response to a command request, I/O operation and the like) and associated states of the paths 304, 306 used with the NVMe and SCSI protocols with respect to LUN A 302. For example, consider a LUN exposed over the first path 304 used for SCSI communications and the second path 306 used for NVMe communications. Assume further, for example, that a SCSI persistent reservation is placed on the LUN by issuing a command over the path 304 using a SCSI-based command. In such an embodiment, the MP driver may, for example, provide for translating between different reservation states of the various different protocols of the paths 304 and 306 over which the same LUN A 302 is presented. The MP driver may also translate or map error codes and state information between the NVMe and SCSI protocols. For example, the MP driver may receive an error code or state information as a result of an I/O operation issued over the second NVMe path 306 to the LUN A 302 which indicates a media or hardware error. The MP driver may determine the equivalent error code or state information in the SCSI protocol and note the equivalent error code or state information as the state of the LUN A 302 on the SCSI path 304.

As another example, consider the reservation conflict status code returned responsive to an aborted reservation command where the command was aborted due to a conflict with an existing reservation. A reservation conflict status code may be returned as a result of requesting a reservation on either the NVMe path 306 or the SCSI path 304. In other words, both the NVMe and SCSI standards define a return status code of reservation conflict for a failed reservation command request. However, the actual returned numeric value of the code denoting the reservation conflict state varies with the standard. For example, the NVMe standard may define a status code value of 0x83 for the reservation conflict state, and the SCSI standard may define a status code value of 0x18 for the reservation conflict state. To further illustrate, consider an example as depicted in the example 400 of FIG. 7 with LUN A 302 exposed to the host 102 over the SCSI path 304 and the NVMe path 306 as described in connection with FIG. 6. Assume further that there is a second host B 402 also connected to the data storage system 120 and that the LUN A 302 is also exposed to the second host B 402 over one or more paths, such as the SCSI path 404 and the NVMe path 406. The paths 404 and 406 are respectively similar to the paths 304 and 306 with the difference that the path 404 and 406 are between the host B 402 and the data storage system 120 rather than between the host 102 and the data storage system 120. The host 102 has existing registrations to LUN A 302 over the paths 304 and 306, and the host 402 has existing registrations to LUN A 302 over the paths 404 and 406. The host 102 may reserve all of LUN A 302 (e.g., reserve the entire LBA range of LUN A 302) for exclusive write access on SCSI path 304. The host 402 may issue reads over the paths 404 and 406 to successfully read data from the LUN A 302. Subsequently, host 402 may then issue a second reservation command to the LUN A 302 over the NVMe path 406 to attempt to reserve some portions of the LBA range of the LUN A 302, for example, for exclusive access by the host 402. In response to the second reservation command, the host 402 may receive a response from the data storage system 120 over the path 406 indicating a reservation conflict status code. The reservation conflict status code in NVMe may be, for example, 0x83 as noted above. The reservation conflict status code in SCSI may be, for example, 0x18 as noted above. The MP driver 408 on the host 402 maps the 2 different possible numeric values of 0x18 and 0x83 for the reservation conflict status codes that may be returned over the paths 404 and 406 to the same error state or condition of reservation conflict status when returning information, for example, to the file system or other layer above the MP driver 408 in the I/O or data path in connection with providing return information to the application level client that issued the second reservation command. As yet another example, assume that the host 102 has issued the reservation command as noted above for exclusive write access for all of LUN A 302 on the SCSI path 304. Subsequently, the host 402 successfully issues reads over the paths 404 and 406 and additionally, rather than issue the second reservation command, assume that the host 402 also issues multiple write commands over the paths 404 and 406. In response to the write commands issued over the paths 404 and 406, the host 402 receives responses indicating that the writes failed and are not performed. First information returned on the path 404 may be as specified in the SCSI standard and may indicate a status code and sense information (e.g., sense key and sense code) denoting the failed write condition and state due to an existing reservation. Second information returned on the path 406 may be as specified in the NVMe standard and may indicate a status code also denoting the failed write condition and state due to an existing reservation. However, the first information and the second information may differ. As such, the MP driver may use a translation or mapping table to determine that, although the values and contents of the first information and the second information differ, the first information and the second information both map to the same corresponding state or condition.

Referring to FIG. 8, shown is an example of a table that may be used by the MP driver in an embodiment in accordance with the techniques herein. The table 500 may also be characterized as a mapping or translation table used to translate and map between equivalent or matching NVMe and SCSI states where the information used to denote the same state in NVMe and SCSI may vary.

The table 500 includes 4 columns of information in which a first column 510a includes information used with the NVMe protocol 510 and in which the remaining 3 columns of information are used with the SCSI protocol 520. The column 510a includes status codes that may be used in the NVMe protocol to denote specified states. The remaining 3 columns of information—status code 520a, sense key 520b and additional sense code 520c—are used in the SCSI protocol to denote specified states. Each row of the table 500 may correspond to a single state where the information in 510a of the row is used by the NVMe protocol to denote the single state, and the information in the combination of 520a, 520b and 520c of the same row is used by the SCSI protocol to denote the same single state. The NVMe and SCSI protocols may further define specific numerical values representing the particular item in each of the columns in the table 500. For example, in row 536 column 510a, the status code for a reservation conflict in the NVMe standard may be a value such as 0x18 and the status code 520a for a reservation conflict in the SCSI standard may be a different value such as 0x83. As known in the art and in the SCSI standard, each particular state denoted by a row may have an associated status code, and where applicable, a sense key and a sense code. Not all states are represented in SCSI using all 3 pieces of information in the columns 520a, 520b and 520c. In some instances as defined by the SCSI standard, for example, a particular state may be represented in SCSI using just a status code 520a, only a status code 520a and sense key 520b, or using all of a status code 520a, a sense key 520b and an additional sense code 520c.

In connection with the SCSI standard known in the art, a Check Condition occurs when a SCSI device needs to report an error. SCSI communication takes place between the initiator, such as a host HBA port and a target, such as the data storage system port exposing the SCSI device. The initiator sends a command to the target which then responds by returning a status code (e.g., column 520a) for the particular command issued. When the target returns a Check Condition in response to a command, the initiator may issue a SCSI Request Sense command to obtain additional information. The target responds to the Request Sense command with a set of SCSI sense data that may specify additional information corresponding to columns 520b and 520c to provide more detail about the particular error.

The information in column 510a of a row in the table 500 may be returned, for example, to the host 102 in response to issuing a command or request over the NVMe path 306 from the host 102 to the data storage system 120. The information in the columns 520a-c in a row of the table 500 may be returned, for example, to the host 102 in response to issuing a command or request over the SCSI path 304 from the host 102 to the data storage system 120.

The table 500 includes information used in connection with representing a few states and conditions selected for purposes of illustration. Generally, the table 500 used in an embodiment may include additional and/or different information than as illustrated in the FIG. 8.

The row 530 includes information used by the NVMe and SCSI protocols to represent a successful completion status. The information in the row 530 may be returned, for example, in response to successful completion of an I/O operation or other request issued. The information in the section 510 of the row 530 may be returned in response to an NVMe command issued over a path such as the NVMe path 306. The information in the section 520 of the row 530 may be returned in response to a SCSI command issued over a path such as the SCSI path 304.

The row 532 includes information used by the NVMe and SCSI protocols to represent a command data block that includes an invalid command opcode. The information in the row 532 may be returned, for example, in response to issuing a write I/O operation where the command data block includes an invalid opcode. The information in the section 510 of the row 532 may be returned in response to an NVMe command issued over a path such as the NVMe path 306. The information in the section 520 of the row 532 may be returned in response to a SCSI command issued over a path such as the SCSI path 304.

The row 534 includes information used by the NVMe and SCSI protocols to represent a command data block that specifies an out of range LBA. The information in the row 534 may be returned, for example, in response to issuing a write I/O operation where the command data block includes an LBA that is out of range for the particular logical device written to. The information in the section 510 of the row 534 may be returned in response to an NVMe command issued over a path such as the NVMe path 306. The information in the section 520 of the row 534 may be returned in response to a SCSI command issued over a path such as the SCSI path 304.

The row 536 includes information used by the NVMe and SCSI protocols to represent a reservation conflict. Consistent with discussion elsewhere herein, the information in the row 536 may be returned, for example, in response to issuing PR request. The information in the section 510 of the row 536 may be returned in response to an NVMe command issued over a path such as the NVMe path 306. The information in the section 520 of the row 536 may be returned in response to a SCSI command issued over a path such as the SCSI path 304.

The row 538 includes information used by the NVMe and SCSI protocols to represent a command data block that specifies a media error that is write fault. The information in the row 538 may be returned, for example, in response to issuing a write I/O operation where the write fails due to the media error. The information in the section 510 of the row 538 may be returned in response to an NVMe command issued over a path such as the NVMe path 306. The information in the section 520 of the row 538 may be returned in response to a SCSI command issued over a path such as the SCSI path 304.

In at least one embodiment, the information in the table 500 may be used by an MP driver of a host, such as the MP drivers 106 and 408, in connection with mapping first information of the NVMe protocol corresponding to a first state to corresponding second information used by the SCSI protocol to also represent the first state. Consistent with discussion herein, for example, the MP driver may receive first information in the section 510 of the row 538 in response to an NVMe write command issued over a path such as the NVMe path 306. Additionally, second information in the section 520 of the row 538 may be returned in response to a SCSI write command issued over a path such as the SCSI path 304. The MP driver may use the table 500 to determine that the foregoing first and second information denote the same media error state. The MP driver may take appropriate action in response such as, for example, return information denote the same error condition or state in connection with the writes issued on both paths 304 and 306.

Assuming that the NVMe write and the SCSI write commands issued, respectively, over the paths 306 and 304 are directed to the same LUN A, the MP driver may also update its internal status information to note that writes issued on any additional paths to the same LUN A are expected to also fail due to the media error. The MP driver may, for example, hold or delay subsequent writes to LUN A on all paths until a corrective action is taken regarding the media error.

In at least one embodiment, the table 500 may be used in connection with a translation or mapping layer that may be embodied in the MP driver or other layer in the software stack such of the host such as illustrated in FIG. 4. There are existing applications and software infrastructure built upon the SCSI architectural model. Subsequently, the existing applications and software infrastructure may now be modified to also include support for the NVMe protocol as well as the SCSI protocol. In such a case, an embodiment may utilize the existing software stack including code written in accordance with the SCSI protocol and add an additional mapping layer to interface with the NVMe driver as may be needed. In at least one embodiment, one or more additional tables may also be used which map or translate information between the NVMe and SCSI protocols. For example, an embodiment may include another table of information that maps a SCSI command to its corresponding functional NVMe command. For example, an additional table may map the SCSI inquiry command to the corresponding NVMe identify command as discussed elsewhere herein.

Host software implementing the mapping between SCSI information (e.g., commands and status information used in the SCSI protocol) and corresponding NVMe information (e.g., commands and status information used in NVMe protocol) may be logically viewed as a layer within the operating system stack such as described in connection with FIG. 4. For example, in at least one embodiment, existing code of the MP driver 106 may embody logic based on the SCSI standard and interface with the SCSI driver. In connection with the techniques herein, the MP driver 106 may now also interface with an NVMe driver, for example, in connection with transmission sent and received over NVMe paths 306 and 406 of FIG. 7. In such an embodiment, the existing code of the MP driver 106 may be modified to include a translation layer that further serves as an interface between the MP driver 106 and the NVMe driver. The translation layer may perform any needed mapping or translation between SCSI commands and NVMe commands and any needed mapping or translation between SCSI state information and NVMe state information (e.g., as discussed in connection with FIG. 8).

Figure 7:
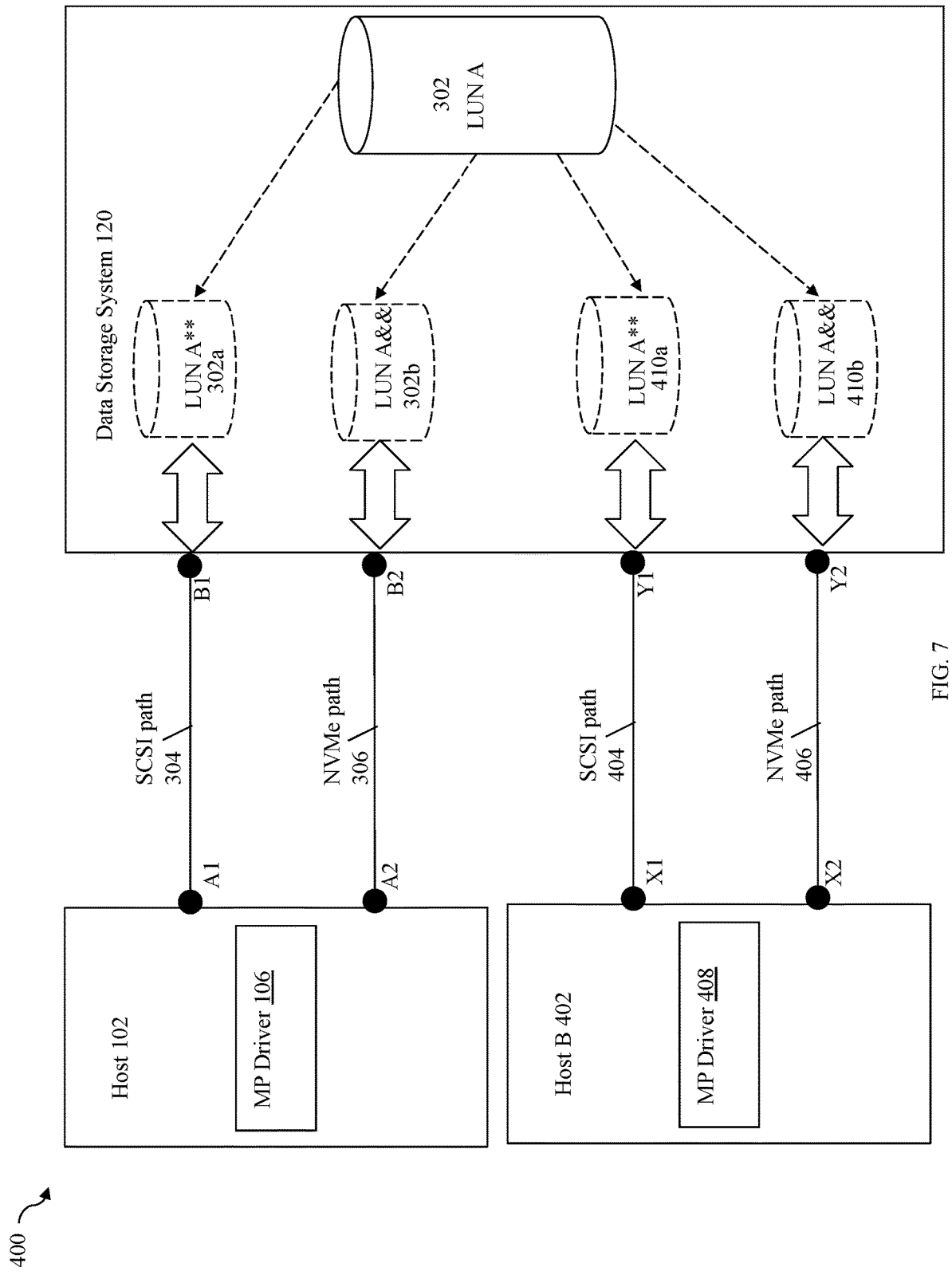

It should be noted that the particular examples described herein are non-limiting and should not be construed as a limitation of the techniques herein. For example, FIGS. 6 and 7 illustrate 2 paths between a host and a data storage system. More generally, any number of paths may exist between the host and the data storage system. In at least one embodiment, each of the paths may operate in accordance with a different protocol. For example, there may be 2 paths between the host and data storage system and each path may operate using a different protocol, such as one path using the SCSI protocol and the other path using the NVMe protocol as described herein. More generally, there may be more than 2 paths and collectively all such paths may operate using more than 2 protocols with at least some paths operating using the same protocol. For example, an embodiment may have 3 paths between the host and the data storage system where 2 of the 3 paths operate using the NVMe protocol and the remaining path operates using the SCSI protocol. Also, there may generally be one or more hosts connected to a data storage system.

An embodiment in accordance with the techniques herein may expose the same logical device, unit of storage or logical storage to a host over multiple paths using multiple protocols. In at least one embodiment, the protocols may include the SCSI protocol and the NVMe protocol. One of the paths may use SCSI over FC and a second of the paths may use NVMe over FC. More generally the protocols of the multiple paths may include any suitable communication protocols.

The techniques herein may be used with any suitable command or request transmitted using the multiple protocols. The commands or requests may include, for example, I/O operations as well as non-I/O operation commands or requests that may vary with the protocols used. For example, the non-I/O operation commands or requests in the SCSI protocol may include registration commands, reservation commands, commands (e.g., inquiry commands) used to obtain status information regarding a device and the data storage system, commands (e.g., request sense command) used to obtain status information regarding the result of a previously reported error state due to a failed command, and others. For example, the non-I/O operation commands or requests in the NVMe protocol may include registration commands, reservation commands, identify commands, and others.

In connection with the description above, a SCSI inquiry page 0x83 command may be used with paths operating using the SCSI protocol, such as SCSI over FC, to obtain a protocol level personality and identity for a LUN. The protocol level personality and identify for the LUN may include a protocol level identifier for the LUN, such as a WWN, used to identify the LUN at the protocol level. Consider a first LUN exposed over path A using the SCSI protocol, such as SCSI over FC, and a second LUN exposed over path B using the SCSI protocol. The first LUN visible to the host on path A may have a first protocol level identifier and the second LUN visible to the host on path B may have a second protocol level identifier. If the first protocol level identifier and the second protocol level identifiers are the same, then the first LUN and the second LUN are the same LUN (having the same device native ID) exposed over paths A and B both using the same protocol. Otherwise, if the first protocol level identifier and the second protocol level identifiers are different, then the first LUN and the second LUN are configured on the data storage system as two different LUNs (e.g., different associated provisioned storage) having different device native IDs. Other protocols, such as NVMe over FC, have different protocol level identifiers such as namespace GUIDs that may be similarly used to determine whether 2 logical storage entities that are visible over 2 paths operating using NVMe over FC are the same LUN (e.g., having the same namespace GUID) or configured as two different LUNs (e.g., having different namespace GUIDs).

Figure 9:
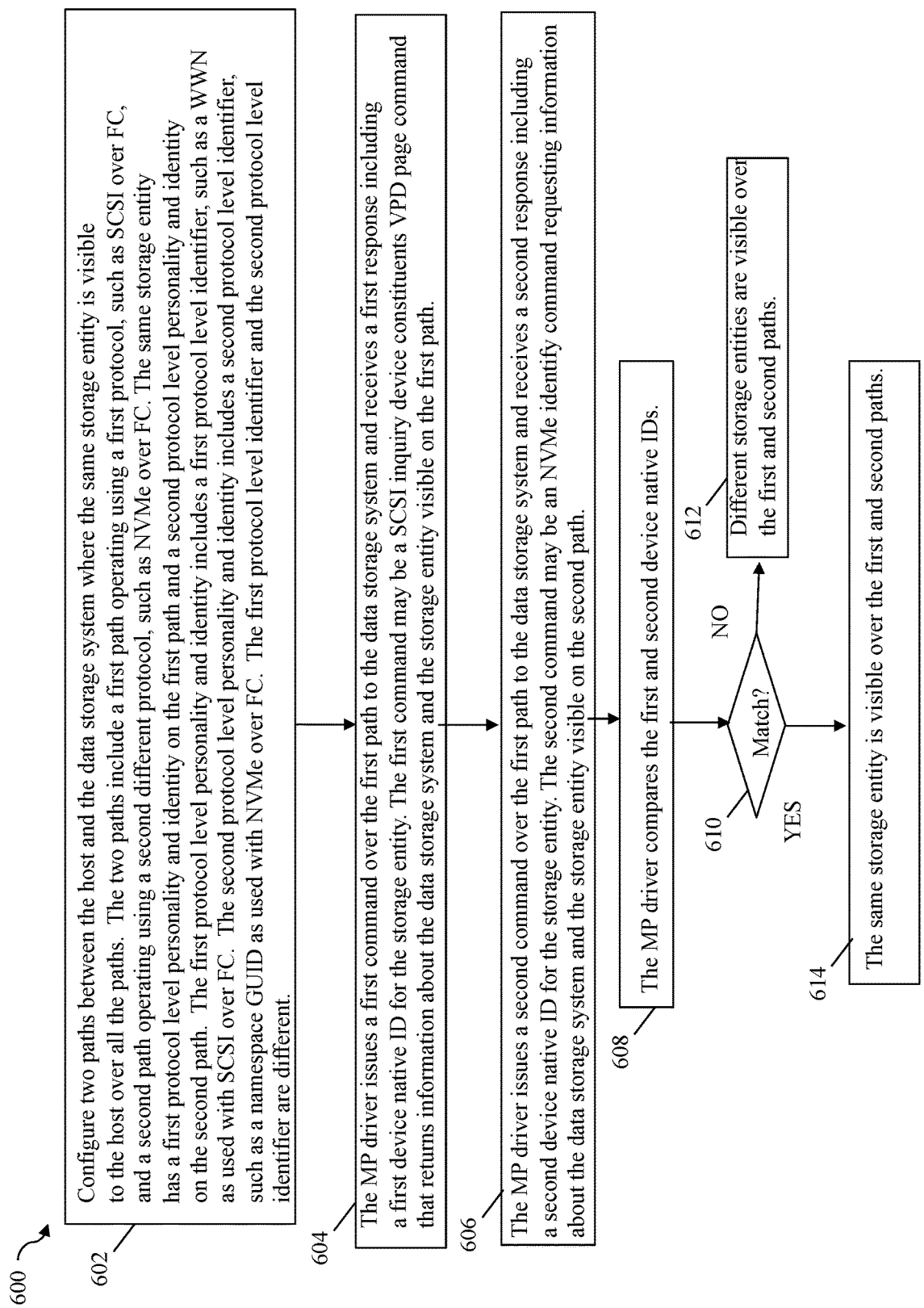
FIG. 9 is a flowchart of processing steps that may be performed in an embodiment in accordance with the techniques herein.

Referring to FIG. 9, shown is a flowchart of processing steps that summarize processing that may be performed in an embodiment in accordance with the techniques herein. The flowchart 600 summarizes processing described above with respect to two paths. More generally, the processing of the flowchart 600 may performed with respect to any suitable number of multiple paths and is not limited to 2 paths with 2 different protocols.

At the step 602, processing is performed to configure two paths between the host and the data storage system where the same storage entity is visible to the host over both paths. The two paths include a first path operating using a first protocol, such as SCSI over FC, and a second path operating using a second different protocol, such as NVMe over FC. The same storage entity has a first protocol level personality and identity on the first path and a second protocol level personality and identity on the second path. The first protocol level personality and identity includes a first protocol level identifier, such as a WWN as used with SCSI over FC. The second protocol level personality and identity includes a second protocol level identifier, such as a namespace GUID as used with NVMe over FC. The first protocol level identifier and the second protocol level identifier are different. From the step 602, processing proceeds to the step 604.

At the step 604, the MP driver issues a first command over the first path to the data storage system and receives a first response including a first device native ID for the storage entity. The first command may be a SCSI inquiry device constituents VPD page command that returns information about the data storage system and the storage entity visible on the first path. From the step 604, control proceeds to the step 606.

At the step 606, the MP driver issues a second command over the first path to the data storage system and receives a second response including a second device native ID for the storage entity. The second command may be an NVMe identify command requesting information about the data storage system and the storage entity visible on the second path. From the step 606, control proceeds to the step 608.

At the step 608, the MP driver compares the first and second device native IDs. From the step 608, control proceeds to the step 610 where a determination is made as to whether the first and second device native IDs match. If the step 610 evaluates to yes, control proceeds to the step 614 where processing determines that the same storage entity having the first and second matching device native IDs is visible over the first and second paths. Otherwise, if the step 610 evaluates to no, control proceeds to the step 612 where processing determines that the same storage entity is not visible over the first and second paths. Rather, in the step 612, the processing determines that a first storage entity having the first device native ID is visible over the first path and a second different storage entity having the second device native ID is visible over the second path.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing requests comprising:
configuring a plurality of paths between a host and a data storage system, wherein a same storage entity of the data storage system is visible to the host over the plurality of paths, wherein a first path of the plurality of paths is used to communicate using a first protocol and a second path of the plurality of paths is used to communicate using a second protocol that is different from the first protocol, wherein the same storage entity is configured to have a first protocol level personality and identity when presented to the host over the first path and wherein the same storage entity is configured to have a second protocol level personality and identity when presented to the host over the second path;
issuing a first request in accordance with the first protocol over the first path to the same storage entity to obtain a first device native identifier of the same storage entity;
responsive to the first request, receiving a first response including first information denoting the first device native identifier of the same storage entity;
issuing a second request in accordance with the second protocol over the second path to the same storage entity to obtain a second device native identifier of the same storage entity;
responsive to the second request, receiving a second response including second information denoting the second device native identifier of the same storage entity;
determining that the first device native identifier and the second device native identifier match; and
responsive to determining the first device native identifier and the second device native identifier match, performing processing on the host that recognizes that the same storage entity is visible on both the first path and the second path.

2. The method of claim 1, wherein the first protocol level personality and identity include a first protocol level identifier used to identify the same storage entity in accordance with the first protocol.

3. The method of claim 2, wherein the second protocol level personality and identity include a second protocol level identifier used to identify the same storage entity in accordance with the second protocol.

4. The method of claim 3, wherein the first protocol level identifier and the second level protocol identifier are different.

5. The method of claim 2, wherein the same storage entity is visible to the host over a third path of the plurality of paths, the first path and the third path both communicate using the first protocol, the same storage entity is configured to have a third protocol level personality and identity when presented to the host over the third path, the third protocol level personality and identity include a third protocol level identifier, and wherein the third protocol level identifier and the first protocol level identifier match.

6. The method of claim 5, wherein a fourth path between the host and the data storage system operate using the first protocol, a second storage entity of the data storage system is visible to the host over the fourth path, the second storage entity has a fourth protocol level personality and identity including a fourth protocol level identifier, and wherein the method further comprises:
determining whether the first protocol level identifier and the fourth protocol level identifier match;
responsive to determining the first protocol level identifier and the fourth protocol level identifier match, determining that the second storage entity is the same storage entity; and
responsive to determining the first protocol level identifier and the fourth protocol level identifier do not match, determining that the second storage entity and the same storage entity are two different storage entities.

27

7. The method of claim 1, further comprising:
determining the first device native identifier and the second device native identifier using one or more attributes of the data storage system upon which the same storage entity is configured.

8. The method of claim 7, wherein said determining the first device native identifier and the second device native identifier use one or more local attributes of the same storage entity as defined in the data storage system upon which the same storage entity is configured.

9. The method of claim 8, wherein the first device native identifier and the second device native identifier are each formed using a serial number or identifier of the data storage system.

10. The method of claim 9, wherein the first device native identifier and the second device native identifier are each formed using a local device number of the same storage entity, wherein the local device number uniquely identifies the same storage entity with respect to other logical storage entities configured in the data storage system.

11. The method of claim 1, wherein a multi-path (MP) driver of the host performs the processing that recognizes that the same storage entity is visible on both the first path and the second path.

12. The method of claim 11, wherein the MP driver presents the same logical device to an application that issues a plurality of I/O operations to the same storage entity.

13. The method of claim 12, wherein the MP driver transmits the plurality of I/O operations to the same storage entity over the plurality of paths.

14. The method of claim 13, wherein, for each of the plurality of I/O operations, the MP driver selects, in accordance with a load balancing technique, one of the plurality of paths to send said each I/O operation from the host to the data storage system.

15. The method of claim 1, wherein the first response is sent over the first path from the data storage system to the host, and wherein the second response is sent over the second path from the data storage system to the host.

16. A system comprising:
at least one processor; and
a memory comprising code stored thereon that, when executed, performs a method of processing requests comprising:
configuring a plurality of paths between a host and a data storage system, wherein a same storage entity of the data storage system is visible to the host over the plurality of paths, wherein a first path of the plurality of paths is used to communicate using a first protocol and a second path of the plurality of paths is used to communicate using a second protocol that is different from the first protocol, wherein the same storage entity is configured to have a first protocol level personality and identity when presented to the host over the first path and wherein the same storage entity is configured to have a second protocol level personality and identity when presented to the host over the second path;
issuing a first request in accordance with the first protocol over the first path to the same storage entity to obtain a first device native identifier of the same storage entity;
responsive to the first request, receiving a first response including first information denoting the first device native identifier of the same storage entity;

28 issuing a second request in accordance with the second protocol over the second path to the same storage entity to obtain a second device native identifier of the same storage entity;
responsive to the second request, receiving a second response including second information denoting the second device native identifier of the same storage entity;
determining that the first device native identifier and the second device native identifier match; and
responsive to determining the first device native identifier and the second device native identifier match, performing processing on the host that recognizes that the same storage entity is visible on both the first path and the second path.

17. A non-transitory computer readable medium comprising code stored thereon that, when executed, perform a method of processing requests comprising:
configuring a plurality of paths between a host and a data storage system, wherein a same storage entity of the data storage system is visible to the host over the plurality of paths, wherein a first path of the plurality of paths is used to communicate using a first protocol and a second path of the plurality of paths is used to communicate using a second protocol that is different from the first protocol, wherein the same storage entity is configured to have a first protocol level personality and identity when presented to the host over the first path and wherein the same storage entity is configured to have a second protocol level personality and identity when presented to the host over the second path;
issuing a first request in accordance with the first protocol over the first path to the same storage entity to obtain a first device native identifier of the same storage entity;
responsive to the first request, receiving a first response including first information denoting the first device native identifier of the same storage entity;
issuing a second request in accordance with the second protocol over the second path to the same storage entity to obtain a second device native identifier of the same storage entity;
responsive to the second request, receiving a second response including second information denoting the second device native identifier of the same storage entity;
determining that the first device native identifier and the second device native identifier match; and
responsive to determining the first device native identifier and the second device native identifier match, performing processing on the host that recognizes that the same storage entity is visible on both the first path and the second path.

18. The non-transitory computer readable medium of claim 17, wherein the first protocol level personality and identity include a first protocol level identifier used to identify the same storage entity in accordance with the first protocol.

19. The non-transitory computer readable medium of claim 18, wherein the second protocol level personality and identity include a second protocol level identifier used to identify the same storage entity in accordance with the second protocol.

20. The non-transitory computer readable medium of claim 19, wherein the first protocol level identifier and the second level protocol identifier are different.

* * * * *